(12) United States Patent
Wu

(10) Patent No.: US 12,386,698 B2
(45) Date of Patent: Aug. 12, 2025

(54) MEMORY CHIPS AND OPERATING METHODS THEREOF

(71) Applicant: WUHAN XINXIN SEMICONDUCTOR MANUFACTURING CO., LTD., Hubei (CN)

(72) Inventor: Bin Wu, Wuhan (CN)

( * ) Notice: Subject to any disclaimer, the term of this patent is extended or adjusted under 35 U.S.C. 154(b) by 65 days.

(21) Appl. No.: 18/544,572

(22) Filed: Dec. 19, 2023

(65) Prior Publication Data

US 2025/0173216 A1    May 29, 2025

(30) Foreign Application Priority Data

Nov. 28, 2023  (CN) .......................... 202311622815.9

(51) Int. Cl.
*G06F 11/10* (2006.01)
*G06F 9/448* (2018.01)

(52) U.S. Cl.
CPC ........ *G06F 11/1016* (2013.01); *G06F 9/4498* (2018.02); *G06F 11/1052* (2013.01); *G06F 11/1068* (2013.01)

(58) Field of Classification Search
CPC ............. G06F 11/1052; G06F 11/1068; G06F 9/4498; G06F 11/1016
USPC .................. 714/764, 768, 769, 773, 774
See application file for complete search history.

(56) References Cited

U.S. PATENT DOCUMENTS

| | | | | |
|---|---|---|---|---|
| 5,682,394 A * | 10/1997 | Blake | .................. | G06F 11/1052 |
| | | | | 714/763 |
| 7,689,814 B2 * | 3/2010 | Okawa | .................. | G06F 11/004 |
| | | | | 712/227 |
| 2006/0143509 A1 * | 6/2006 | Okawa | ................ | G06F 11/1052 |
| | | | | 714/E11.144 |
| 2019/0198114 A1 * | 6/2019 | Ben-Rubi | .......... | G11C 16/3459 |

* cited by examiner

Primary Examiner — John J Tabone, Jr.
(74) *Attorney, Agent, or Firm* — JMB DAVIS BEN-DAVID

(57) ABSTRACT

This disclosure discloses a memory chip and an operating method thereof. The operating method incudes: determining whether a quantity of one or more written memory units in a storage space of the one or more storage spaces is less than or equal to a preset quantity or a write address corresponding to a write instruction is smaller than one of storage addresses of the storage space; in response to determining that the quantity of the one or more written memory units in the storage space is less than or equal to the preset quantity or the write address corresponding to the write instruction is smaller than the one of storage addresses of the storage space, determining an operating state of the storage space as a part programmed state; and disabling an error correction mechanism for the storage space in the part programmed state.

20 Claims, 10 Drawing Sheets

MEMORY CHIPS AND OPERATING METHODS THEREOF

CROSS-REFERENCE TO RELATED APPLICATION

This application claims priority to and the benefit of Chinese Patent Application No. 202311622815.9, filed on Nov. 28, 2023, the disclosure of which is incorporated herein by reference in its entirety.

TECHNICAL FIELD

The present disclosure relates to storage technologies, and in particular, to memory chips and operating methods thereof.

BACKGROUND

In a NOR Flash, an error correct code (ECC) is generally calculated in units of storage spaces with a certain quantity of memory units, and the storage spaces may be in different operating states. For memory units in different operating states, some problems may occur during error correction.

SUMMARY

In a first aspect, the present disclosure provides an operating method for a memory chip, where the memory chip includes one or more storage spaces, and the operating method includes: determining whether a quantity of one or more written memory units in a storage space of the one or more storage spaces is less than or equal to a preset quantity or a write address corresponding to a write instruction is smaller than one of storage addresses of the storage space; in response to determining that the quantity of the one or more written memory units in the storage space is less than or equal to the preset quantity or the write address corresponding to the write instruction is smaller than the one of storage addresses of the storage space, determining an operating state of the storage space as a part programmed state; and disabling an error correction mechanism for the storage space in the part programmed state.

In a second aspect, the present disclosure provides a memory chip, where the memory chip includes one or more storage spaces, a first logic circuit, and a finite-state machine. The first logic circuit is configured to determine whether a quantity of one or more written memory units in a storage space of the one or more storage spaces is less than or equal to a preset quantity or a write address corresponding to a write instruction is smaller than one of storage addresses of the storage space, and is further configured to, in response to determining that the quantity of the one or more written memory units in the storage space is less than or equal to the preset quantity or the write address corresponding to the write instruction is smaller than the one of storage addresses of the storage space, determine an operating state of the storage space as a part programmed state. The finite-state machine is configured to disable an error correction mechanism for the storage space in the part programmed state.

DETAILED DESCRIPTION

Some embodiments of the present disclosure will be described in detail below in connection with the accompanying drawings. The embodiments are described for illustrative purposes only and are not intended to limit the present disclosure.

In addition, the terms "first" and "second" are only used for descriptive purposes and cannot be understood as indicating or implying relative importance or implicitly indicating a number of indicated technical features. Therefore, the terms "first" and "second" may indicate including one or more of the described features, explicitly or implicitly. In the description of the present disclosure, "a plurality of" means two or more, unless otherwise explicitly and specifically limited.

Figure 1:
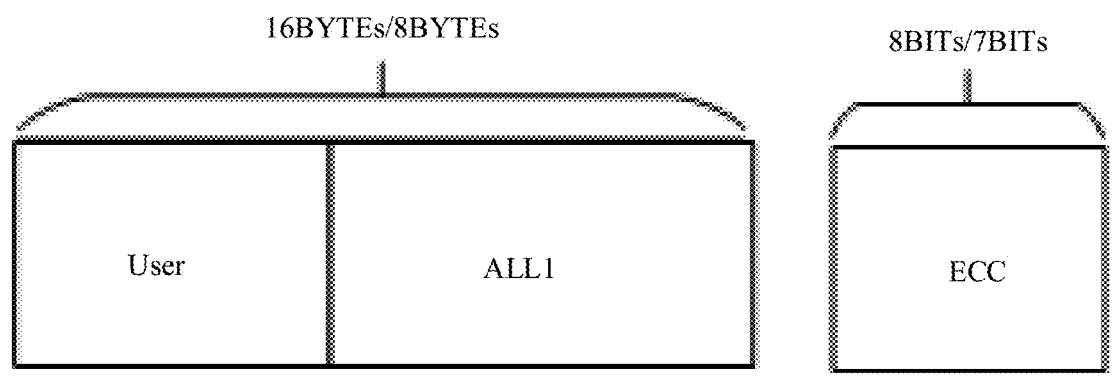
FIG. 1 is a schematic diagram of a data storage structure of each memory unit in a page buffer of a memory chip in the related art.
Figure 2:
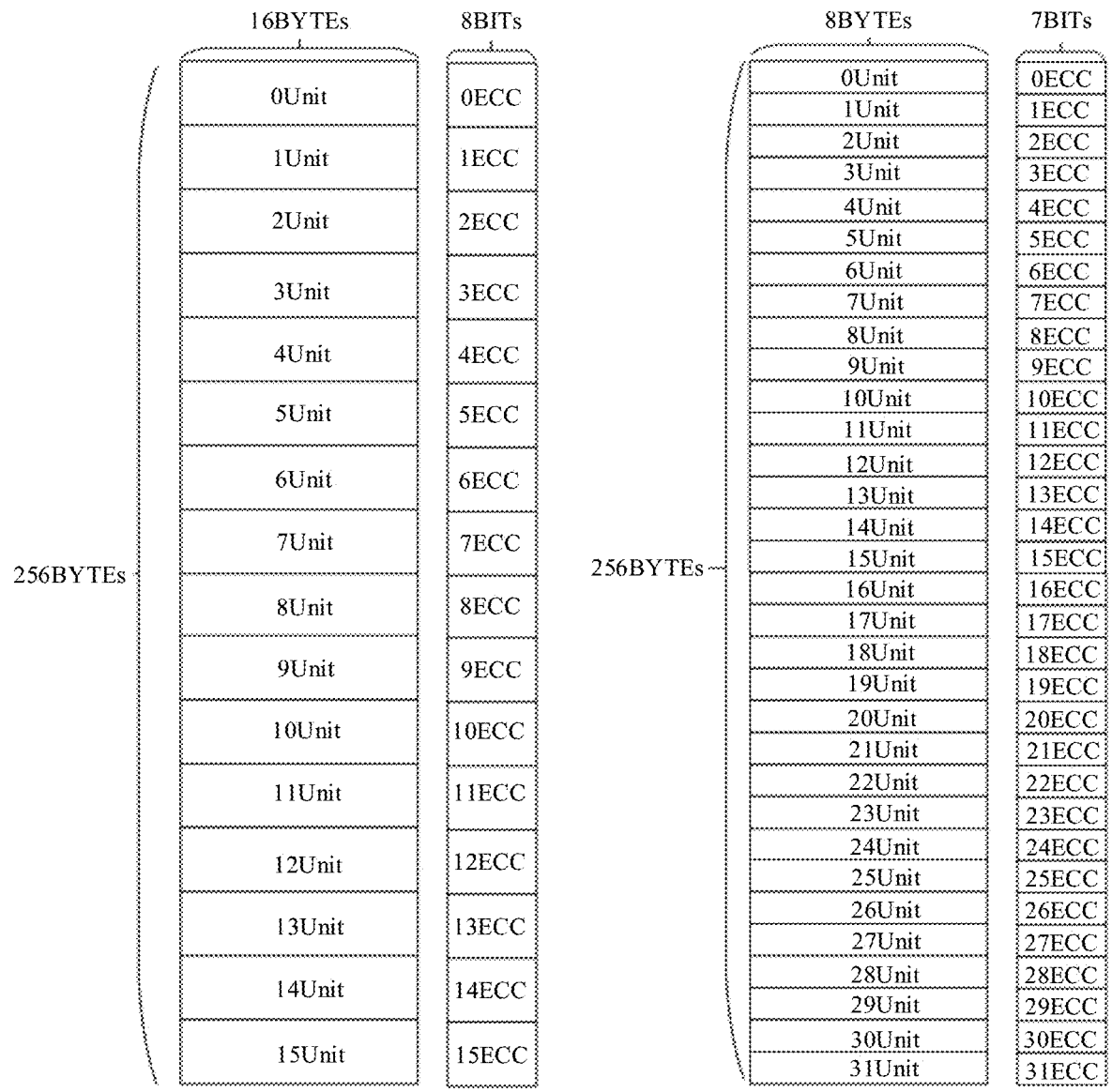
FIG. 2 is a schematic structural diagram of the page buffer with the data storage structure shown in FIG. 1.

FIG. 1 is a schematic diagram of a data storage structure of each memory unit in a page buffer of a memory chip in the related art. FIG. 2 is a schematic structural diagram of the page buffer with the data storage structure shown in FIG. 1. A page buffer or data input buffer of an NOR Flash is generally 256 bytes. Calculation of an error correction mechanism of NOR Flash is generally performed with a storage space of 16 bytes or 8 bytes as a unit to obtain a corresponding initial error correction code (ECC). The ECC corresponding to each storage space is 8 bits or 7 bits. The ECC generally adopts a Hamming code, which can correct a 1 bit error in a storage space of 16 bytes or 8 bytes.

User is used to represent user data or input data, and ALL1 represents that each bit value of the corresponding data is a logical value "1".

FIG. 2 is a schematic structural diagram of the page buffer with the data storage structure shown in FIG. 1. A page buffer of 256 bytes is taken as an example herein. In some examples, each page buffer is divided into 16 storage spaces (0Unit, . . . , and 15Unit) with 16 bytes as one unit. The error correction mechanism is performed on each of the 16 storage spaces to obtain an ECC of 8 bits. For example, the error correction mechanism is performed on a storage space of the 0Unit to obtain a 0ECC of 8 bits, and by analogy, the error correction mechanism is performed on a storage space of the 15Unit to obtain a 15ECC of 8 bits. In some examples, each page buffer is divided into 32 storage spaces (0Unit, .

..., and 31Unit) with 8 bytes as one unit. The error correction mechanism is performed on each of the 32 storage spaces to obtain an ECC of 7 bits. For example, the error correction mechanism is performed on a storage space of the 0Unit to obtain a 0ECC of 7 bits, and by analogy, the error correction mechanism is performed on a storage space of the 31Unit to obtain a 31ECC of 7 bits.

Figure 3:
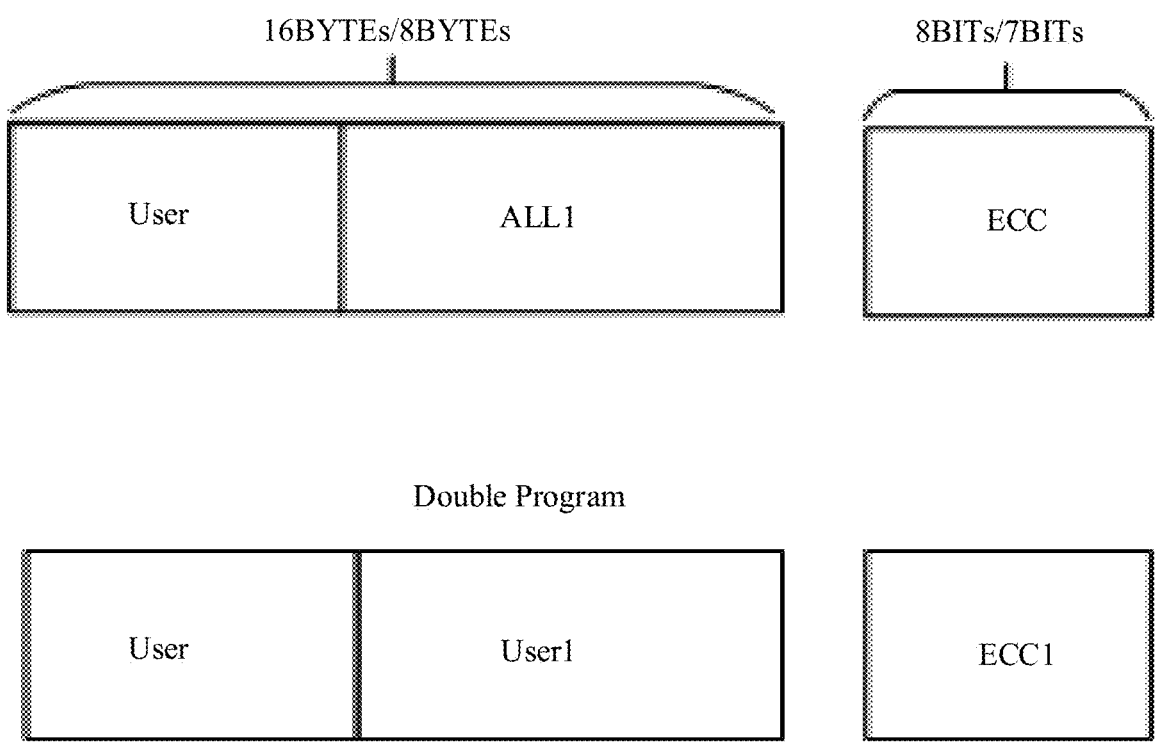
FIG. 3 is a schematic diagram illustrating a defect of memory cells being multiple programmed in the related art.

FIG. 3 is a schematic diagram illustrating a defect of a memory cell having undergone multiple programming in the related art. In the NOR Flash, for example, after each memory cell is erased, an initial state of the each memory cell is "1". Programming is to change the state "1" of a memory cell, into which data "0" need be written, to a state "0". While a corresponding memory cell, into which data "1" is written, does not need to be programmed. Generally, an erase operation is required, since the programming operation cannot change original data "0" in the memory cell to "1".

When the user data or input data is less than 16 bytes or 8 bytes of each storage space, the user data and all original "1" in the unit are combined to calculate ECC (8 bits or 7 bits), and the user data and ECC are programmed onto the memory cell of the NOR FLASH. Before erasing the memory cells, after all-1 part of these memory cells is reprogrammed, the error correction code will be recalculated to obtain ECC1. If ECC1 is different from ECC, due to the multiple programming in one memory cell without erasing, the logic value "1" in ECC1 cannot replace the logic value "0" in ECC, which will cause read data of ECC1 to be incorrect, and thus an error occurred during the process. Of course, in some examples, ECC can also be calculated based on 0(s) in the memory cells.

It can be seen that performing a programming operation on two erase operations on the same memory cell still has high accuracy. However, in order to improve a storage life or operating efficiency, two or more programming operations need to be performed between two erase operations.

Figure 4:
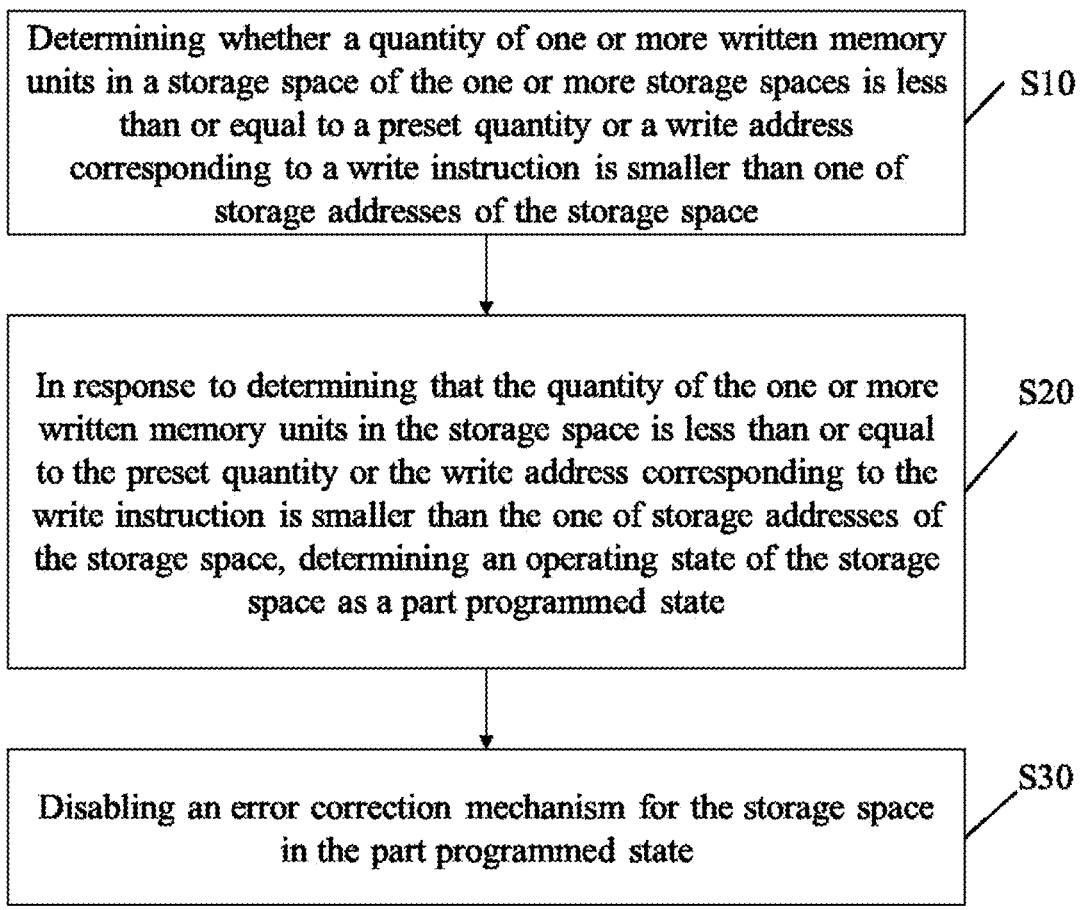
FIG. 4 is a schematic flowchart of an operating method according to some embodiments of the present disclosure.

In some embodiments of the present disclosure, an operating method of a memory chip is provided. As shown in FIG. 4, the operating method includes the following operations:

in operation S10, whether a quantity of one or more written memory units in a storage space of the one or more storage spaces is less than or equal to a preset quantity or a write address corresponding to a write instruction is smaller than one of storage addresses of the storage space is determined;

in operation S20, in response to determining that the quantity of the one or more written memory units in the storage space is less than or equal to the preset quantity or the write address corresponding to the write instruction is smaller than the one of storage addresses of the storage space, an operating state of the storage space is determined as a part programmed state; and in operation S30, an error correction mechanism is disabled for the storage space in the part programmed state.

It may be understood that, according to the operation method provided herein, the operating state of the storage space may be determined as the part programmed state when the quantity of the written memory units in the storage space is less than or equal to the preset quantity or the write address corresponding to the write instruction is smaller than one of storage addresses of the storage space; and the error correction mechanism is disabled for the storage space in the part programmed state. Since the quantity of written memory units in the storage space in the part programmed state is small, a reading success rate is still high without the error correction mechanism, and adverse effects brought by the error correction mechanism are reduced. For example, addition of threads that implement the error correction mechanism is required during a reading process, which reduces reading efficiency.

Since the operating state of the storage space may be determined as the part programmed state through one of: determining that the quantity of the written memory units in the storage space is less than or equal to the preset quantity; or determining the write address corresponding to the write instruction is smaller than one of storage addresses of the storage space. In this way, methods of determining the part programmed state are added, thereby improving applicability.

It is to be noted that how to distinguish a part programmed state, an error correction protection state, or a multiple programmed state is not limited to the method(s) provided in this disclosure. For example, it may be determined whether the storage space is in the multiple programmed state by setting a count bit or a flag bit (e.g., one or more first flag bits, one or more second flag bits, and one or more error correction bits for storing an error correction code).

The error correction mechanism is disabled for the storage space in the part programmed state during a reading process, which can reduce adverse effects of the error correction mechanism with a higher reading success rate.

In some embodiments, the preset quantity is a value less than or equal to ½ or ⅓ of a total quantity of the memory units in the storage space.

It is to be noted that, in a storage space with memory units of 8 bytes, the preset quantity is less than 64, which can ensure that not all memory units in the corresponding storage space have been written to. For example, at least one memory unit has not been written to. It is to be noted that, in a storage space with memory units of 16 bytes, the preset quantity is less than 128, which can ensure that not all memory units in the corresponding storage space have been written to. For example, at least one memory unit has not been written to.

The last address of the storage space may be the largest one of the storage addresses corresponding to the storage space. In this way, during writing in order of storage addresses, a memory unit corresponding to the last address is always written to after other memory units have been written to. This can also ensure that not all memory units in the corresponding storage space have been written to. For example, at least one memory unit has not been written to.

In some embodiments, the determining of whether the quantity of the one or more written memory units in the storage space of the one or more storage spaces is less than or equal to the preset quantity includes: when memory units in the storage space are in an erased state or an unwritten state, determining whether the quantity of the one or more written memory units in the storage space is less than or equal to the preset quantity based on a cumulative quantity of the written memory units in the storage space.

It is to be noted that the erased state or the unwritten state may refer to a state in which the memory units in the storage space have been erased but have not been written to, and data in each memory unit is in an initial state "1". In this case, disabling the error correction mechanism can save thread operations in the memory chip.

In some embodiments, the determining of whether the quantity of the one or more written memory units in the storage space of the one or more storage spaces is less than or equal to the preset quantity includes: when the storage space has included write data before a data write into the storage space, determining whether the quantity of the one or more written memory units in the storage space is less than or equal to the preset quantity based on a total amount of the written data that has been included by the storage space and data that is written into the storage space in the data write.

In some embodiments, the operating method further includes: in response to determining that the quantity of the written memory units in the storage space is greater than the preset quantity or the write address corresponding to the write instruction comprises a last storage address of the storage space, determining an operating state of the storage space as an error correction protection state; and enabling the error correction mechanism for the storage space in the error correction protection state.

It may be understood that, in the operating method(s) provided herein, the operating state of the storage space may be determined as the error correction protection state when the quantity of the written memory units in the storage space is greater than the preset quantity or the write address corresponding to the write instruction includes the last address of the storage space, which helps to increase a quantity of storage spaces in the error correction protection state. On this basis, the error correction mechanism is enabled for the storage space in the error correction protection state during the reading process, which can improve reading accuracy of a larger quantity of storage spaces in the error correction protection state.

Since the operating state of the storage space may be determined as the error correction protection state through one of: determining that the quantity of the written memory units in the storage space for ECC calculation in units is greater than the preset quantity; or determining that the write address corresponding to the write instruction includes the last address of the storage space. In this way, methods of determining the error correction protection state are added, thereby improving applicability.

It is to be noted that, in some embodiments, the error correction mechanism may alternatively be disabled for the storage space in the error correction protection state during operation, such as during a reading process, which can reduce error correction links during the reading process and can speed up reading or improve reading efficiency.

It is to be noted that an ECC is calculated with one or more storage spaces as a unit in this disclosure.

In some embodiments, the operating method further includes: setting at least one flag bit to represent the operating state of the storage space. The operating state includes a multiple programmed state that disables the error correction mechanism for the storage space.

In some embodiments, the setting at least one flag bit to represent the operating state of the storage space includes: configuring the at least one flag bit to include one or more first flag bits, one or more second flag bits, and one or more error correction bits for storing an error correction code; and setting the first flag bits, the second flag bits, and the error correction bits to represent the operating state of the storage space.

In some embodiments, the storage space includes a memory array, and the setting of the first flag bits, the second flag bits, and the error correction bits to represent the operating state of the storage space: setting data in the first flag bits, data in the second flag bits, and data in the error correction bits in the storage array as all "1" to represent a part programmed state, an erased state, or a storage initial state of the storage space; setting the data in the first flag bits, the data in the second flag bits, and the data in the error correction bits in the storage array as all "0" to represent the multiple programmed state of the storage space; or setting the data in the first flag bits, the data in the second flag bits, and the data in the error correction bits in the storage array as neither all "1" nor all "0" to represent the error correction protection state of the storage space.

In some embodiments, the storage space further includes a page buffer. The first flag bits include a first buffer flag bit located in the page buffer and a first storage flag bit located in each of the memory units. The second flag bits include a second buffer flag bit located in the page buffer and a second storage flag bit located in the each of the memory units. The error correction bits include one or more buffer error correction bits located in the page buffer and one or more storage error correction bits located in the each of the memory units. The setting of the first flag bits, the second flag bits, and the error correction bits to represent the operating state of the storage space include: setting the first storage flag bit to be a first storage flag initial value or a first storage flag final value, wherein the first storage flag initial value is a value of the first storage flag bit before input data corresponding to the write instruction is written into the each of the memory units, and the first storage flag final value is a value of the first storage flag bit after the input data corresponding to the write instruction is written into the each of the memory units; setting the second storage flag bit to be a second storage flag initial value or a second storage flag final value, wherein the second storage flag initial value is a value of the second storage flag bit before the input data corresponding to the write instruction is written into the each of the memory units, and the second storage flag final value is a value of the second storage flag bit after the input data corresponding to the write instruction is written into the each of the memory units; setting the storage error correction bits to be a storage error correction initial value or a storage error correction final value, wherein the storage error correction initial value is a value of the storage error correction bits before the input data corresponding to the write instruction is written into the each of the memory units, and the storage error correction final value is a value of the storage error correction bits after the input data corresponding to the write instruction is written into the each of the memory units; and representing the operating state of the storage space by the first storage flag final value, the second storage flag final value, and the storage error correction final value.

In some embodiments, the operating method further includes: setting the first buffer flag bit to include a first buffer flag initial value or a first buffer flag updated value, setting the second buffer flag bit to include a second buffer flag initial value or a second buffer flag updated value, and setting the buffer error correction bits to include a buffer error correction initial value or a buffer error correction updated value; and assigning the first buffer flag updated value, the second buffer flag updated value, and the buffer error correction updated value respectively as the first storage flag final value, the second storage flag final value, and the storage error correction final value.

In some embodiments, the operating method further includes: setting the first buffer flag updated value as one of 0, 1, and a first buffer flag calculated value; setting the second buffer flag updated value as one of 0, 1, and a second buffer flag calculated value; setting the buffer error correction updated value as one of all "0", all "1", and a buffer error correction calculated value; and determining the first buffer flag updated value, the second buffer flag updated value, and the buffer error correction updated value based on the first storage flag initial value, the second storage flag initial value, and the storage error correction initial value.

In some embodiments, the operating method further includes: determining the first buffer flag calculated value, the second buffer flag calculated value, and the buffer error correction calculated value based on page buffer data and storage data. The page buffer data is data of data bits in the page buffer after the input data is written into the page buffer, and the storage data is data of data bits in the each of the memory units before the input data is written into the each of the memory units.

In some embodiments, the storage space includes a storage array, and the operating state of the storage space may be determined in any of the following three ways:

in a first way, determining the operating state of the storage space through at least one flag bit in the storage array; in a second way, determining the operating state of the storage space through a storage error correction final value and at least one storage flag final value in the storage array; or in a third way, determining the operating state of the storage space through a storage error correction final value, at least one storage flag final value, and intermediate comparison data in the storage array.

Figure 5:
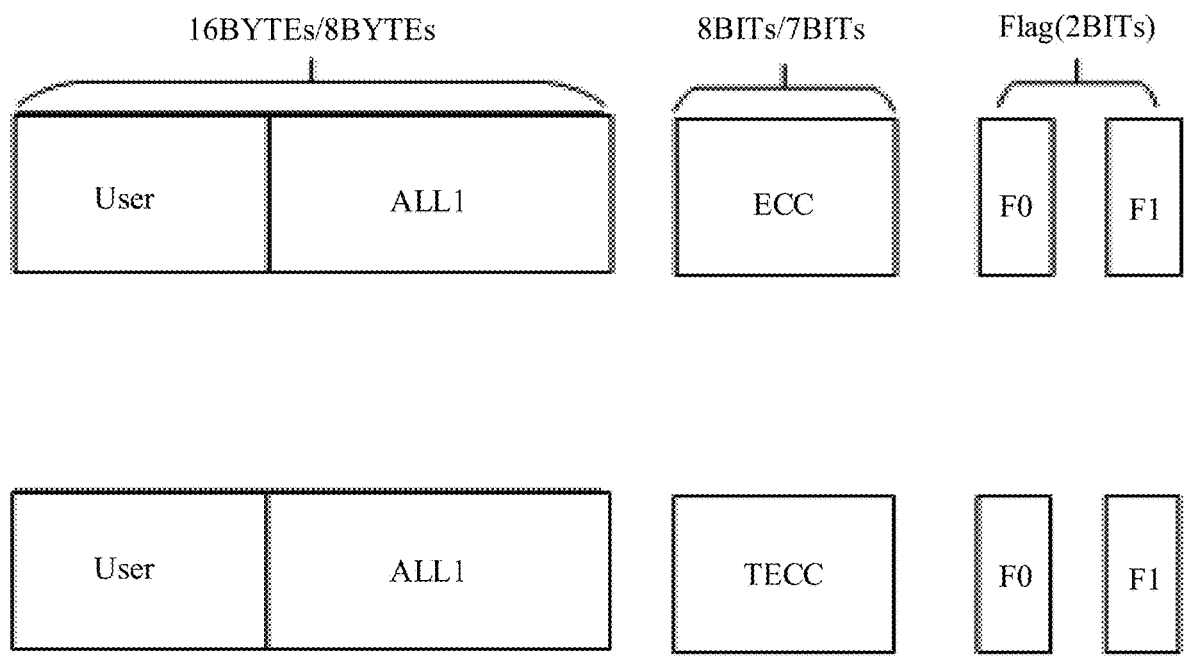
FIG. 5 is a schematic diagram of a process of error correction conversion according to some embodiments of the present disclosure.

FIG. 5 is a schematic diagram of an error correction conversion process according to some embodiments of the present disclosure. For units of 16 bytes/8 bytes, the initial state of these units is ALL1, ALL1 means that initial states of these units are all "1". A corresponding ECC is calculated based on the user data (User) input in the storage space and data in the initial state that has not been written. Flag bits of 2 bits may be further obtained, i.e., F0 of 1 bit and F1 of 1 bit.

In some cases, the ECC needs to be converted to obtain the corresponding buffer error correction calculated value. Then, the error correction protection state or the multiple programmed state may be determined based on the buffer error correction calculated value. Alternatively, in order to improve accuracy, the part programmed state, the error correction protection state, or the multiple programmed state of the storage space may be determined based on the first storage flag final value, the second storage flag final value, and the storage error correction final value. A specific process of this conversion is detailed hereinafter.

It should be noted that TECC is used to represent the error correction bits, F0 is used to represent the first flag bits, and F1 is used to represent the second flag bits. TECC, F0, and F1 further include TECC, F0, and F1 in the storage array or memory unit, TECC, F0, and F1 in the initial state in the page buffer, and calculated TECC, F0, and F1.

Figure 6:
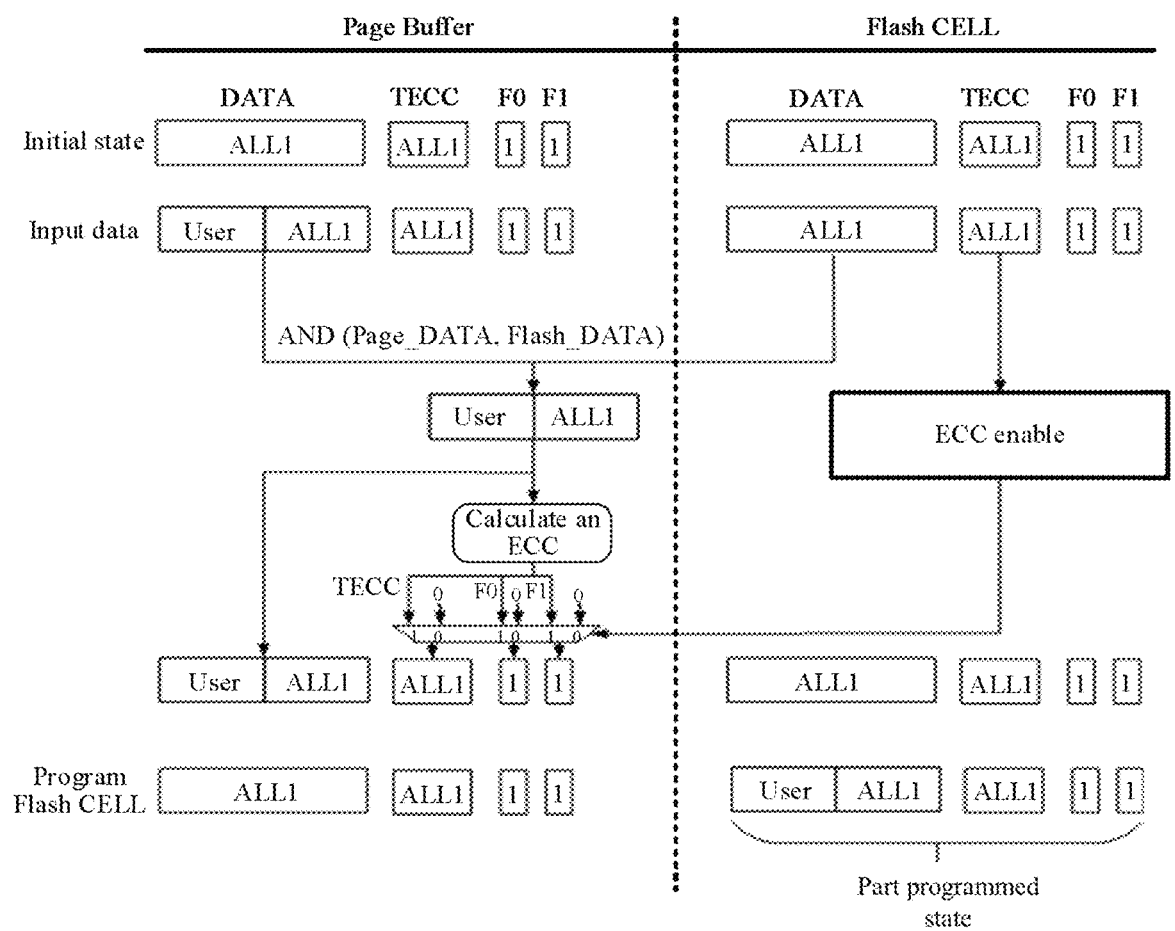
FIG. 6 is a schematic flow of a process of representing a part programmed state according to some embodiments of the present disclosure.

FIG. 6 is a schematic flow of a process of representing a part programmed state according to some embodiments of the present disclosure. In a memory chip, in an initial state or after an erase operation without a programming operation, data (DATA), TECC, F0, and F1 in a page buffer are all "1", and data (DATA), TECC, F0, and F1 in memory units (Flash CELL) of a memory array are also all "1". ALL1 indicates that all corresponding data is the logical value "1". The buffer is a page buffer in some embodiments.

When input data (User) corresponding to a write instruction is written to the page buffer but is not written to the corresponding memory unit, TECC, F0, and F1 in the page buffer are all "1" (the initial state has not changed yet), the data in the page buffer is updated to data (User+ALL1). TECC, F0, and F1 in the memory units (Flash CELL) in the memory array are all "1", and the data in the memory units (Flash CELL) in the memory array is ALL1. The data in the page buffer may be called Page_DATA, and the data in the memory array may be called Flash_DATA.

An AND logical operation is performed on Page_DATA and Flash_DATA, that is, AND (Page_DATA, Flash_DATA), to obtain corresponding intermediate comparison data (i.e., User+ALL1), an error correction mechanism is performed on the intermediate comparison data to calculate a corresponding initial ECC, and the intermediate comparison data is written back to the page buffer. The calculated TECC, F0, and F1 are obtained based on the ECC and the intermediate comparison data.

An all-1 detection is performed on TECC, F0, and F1 in the memory array. If TECC, F0, and F1 in the memory array are all "1" and meet a condition of the part programmed state, in an enable (ECC enable) state, TECC, F0, and F1 that are all "1" in the page buffer may be selected as the buffer error correction updated value, the first buffer flag updated value, and the second buffer flag updated value, respectively.

The buffer error correction updated value, the first buffer flag updated value, and the second buffer flag updated value that are all "1" in the page buffer are programmed (Program Flash CELL) to TECC, F0, and F1 in the memory array, and the data (User+ALL1) in the page buffer is programmed into the memory array. The data, TECC, F0, and F1 in the page buffer are all reset to 1. The data in the memory array is updated to data (User+ALL1), and TECC, F0, and F1 in the memory array are all "1". This case is the part programmed state.

It is to be noted that the condition of the part programmed state is that a quantity of written memory units in a storage space is less than or equal to a preset quantity or a write address corresponding to a write instruction is smaller than one of storage addresses of the storage space.

Figure 7:
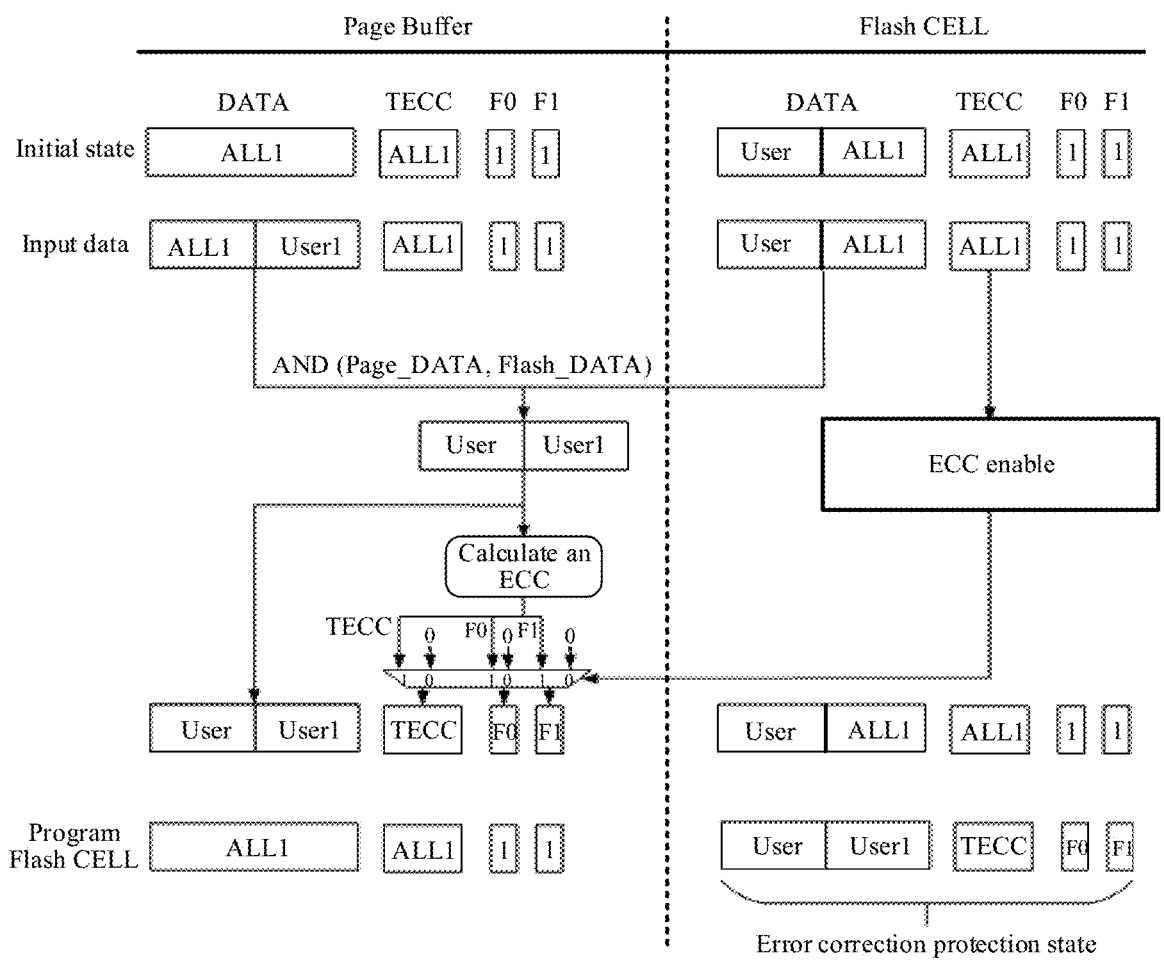
FIG. 7 is a schematic flow of a process of representing an error correction protection state according to some embodiments of the present disclosure.

FIG. 7 is a schematic flow of a process of representing an error correction protection state according to some embodiments of the present disclosure. On the basis of FIG. 6, the data (DATA), TECC, F0, and F1 in the page buffer are all "1". The data (DATA) in the memory unit (Flash CELL) of the memory array is data (User+ALL1), and TECC, F0, and F1 in the memory array are all "1". ALL1 indicates that all corresponding data is the logical value "1".

When input data (User1) corresponding to a write instruction is written to the page buffer but is not written to the memory array, TECC, F0, and F1 in the page buffer are all "1" (the initial state has not changed yet), the data in the page buffer is updated to input data+data in the initial state (User1+ALL1). TECC, F0, and F1 in the memory array are all "1", and the data in the memory units of the memory array is User+ALL1. In this case, the data in the page buffer may be called Page_DATA, and the data in the memory array may be called Flash_DATA. In some embodiments, the buffer is a page buffer.

An AND logical operation is performed on Page_DATA and Flash_DATA, that is, AND (Page_DATA, Flash_DATA), to obtain corresponding intermediate comparison data (User+User1), an error correction mechanism is performed on the intermediate comparison data to calculate a corresponding initial ECC, and the intermediate comparison data is written back to the page buffer. The calculated TECC, F0, and F1 are obtained based on the ECC and the intermediate comparison data.

An all-1 detection is performed on TECC, F0, and F1 in the memory array (that is, ECC_ALL1, F0=1, and F1=1 detection). If TECC, F0, and F1 in the memory array are all "1" and meet a condition of the error correction protection state, in an enable (ECC enable) state, TECC, F0, and F1 calculated in the page buffer may be selected as the buffer error correction updated value, the first buffer flag updated value, and the second buffer flag updated value, respectively.

The memory array is programmed (Program Flash CELL) to write the data (User+User1) in the page buffer to the corresponding memory units (Flash CELL). In this case, the data, TECC, F0, and F1 in the page buffer are all "1", and logical values of TECC, F0, and F1 and data in the memory array are respectively logical values of the calculated TECC, F0, and F1 and the data (User+User1). This state is the error correction protection state.

It is to be noted that, after the data in the page buffer is written to the memory array, the data in the page buffer may be reset to "1". The condition of the error correction protection state is that the quantity of the written memory units in the storage space is greater than the preset quantity or the write address corresponding to the write instruction includes the last address of the storage space.

Figure 8:
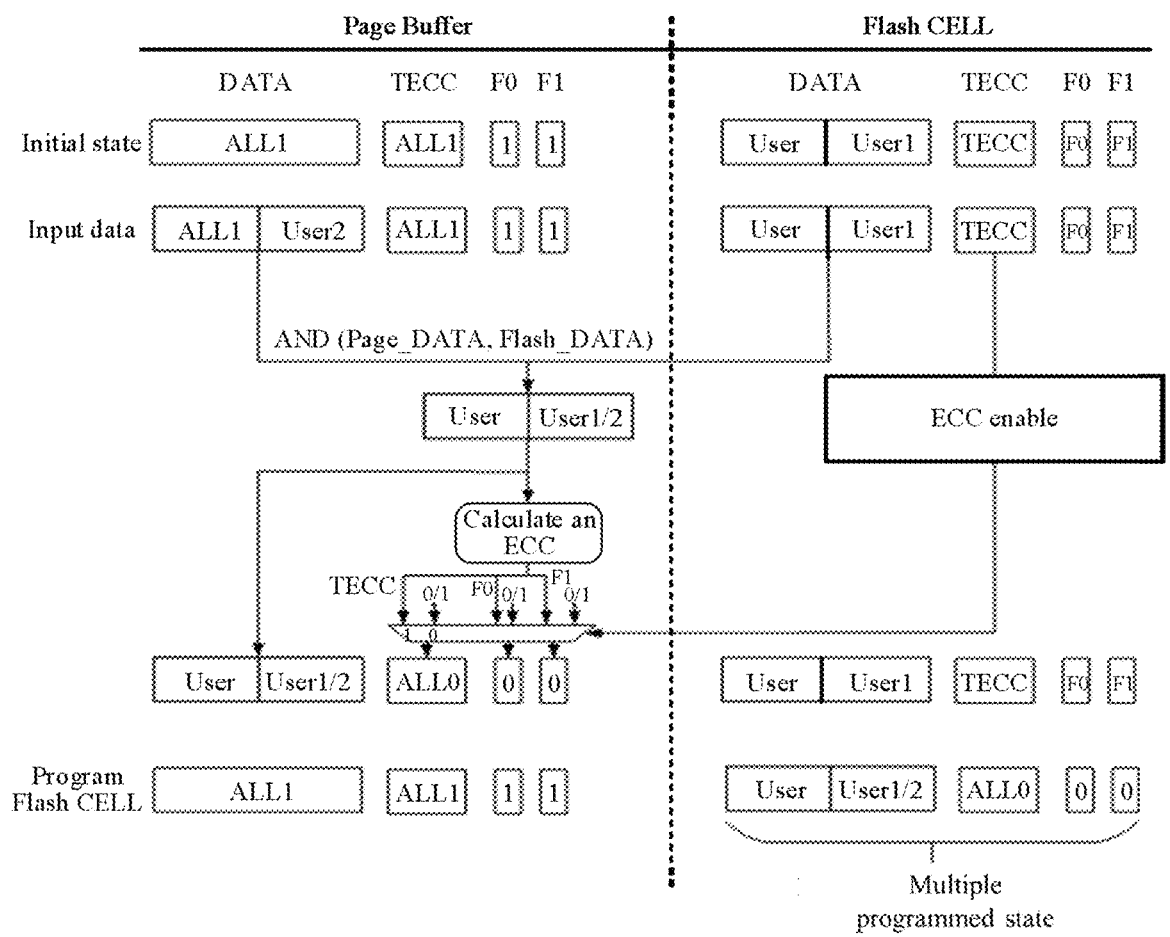
FIG. 8 is a schematic flow of a process of representing a multiple programmed state according to some embodiments of the present disclosure.

FIG. 8 is a schematic flow of a process of representing a multiple programmed state according to some embodiments of the present disclosure. On the basis of FIG. 7, after input data (User2) corresponding to a write instruction is written to the page buffer, in some embodiments, the page buffer is a buffer, TECC, F0, and F1 in the page buffer are all "1", and data (DATA) in the page buffer is data (ALL1+User2). Data in memory units (Flash CELL) of a memory array is data (User+User1), and TECC, F0, and F1 are in final states in FIG. 7. In this case, the data in the page buffer may be called Page_DATA, and the data in the memory array may be called Flash_DATA.

An AND logical operation is performed on Page_DATA and Flash_DATA, that is, AND (Page_DATA, Flash_DATA), to obtain corresponding intermediate comparison data (User+User1+User2), the intermediate comparison data is written back to the page buffer, and a corresponding initial ECC is calculated for the intermediate comparison data. Calculated TECC, F0, and F1 are obtained according to the ECC and the intermediate comparison data. An all-1 detection is performed on TECC, F0, and F1 in the memory array (that is, ECC_ALL1, F0=1, and F1=1 detection). If TECC, F0, and F1 in the memory array are not all "1", in an enable state (ECC enable), TECC, F0, and F1 that are all "0" in the page buffer may be selected as the buffer error correction updated value, the first buffer flag updated value, and the second buffer flag updated value, respectively.

The memory units in the memory array are programmed (Program Flash CELL) to modify TECC, F0, and F1 in the memory array to the logical value "0" and write the data (User+User1+User2) in the page buffer to the memory array.

In this case, the data, TECC, F0, and F1 in the page buffer are all the logical value "1". TECC, F0, and F1 in the memory array are all the logical value "0", and data in the memory array is the data (User+User1+User2). This state is the multiple programmed state. In this case, the error correction mechanism is disabled.

It is to be noted that, after the data in the page buffer is written to the memory array, the data in the page buffer may be reset to the logical value "1".

Generally, the calculated TECC-ECC, and when the ECC is all "0", a value of not all "0" needs to be used as the calculated TECC. Certainly, this is one of the solutions, and there may also be other definitions. For example, when the ECC is defined as all "1" or other values, the multiple programmed state is represented, and a corresponding operation is performed on the calculated TECC.

Figure 9:
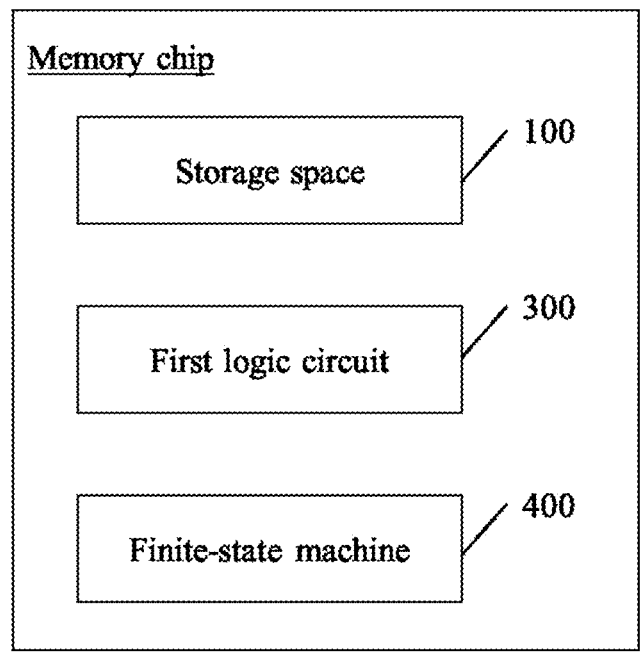
FIG. 9 is a schematic structural diagram of a memory chip according to some embodiments of the present disclosure.
Figure 10:
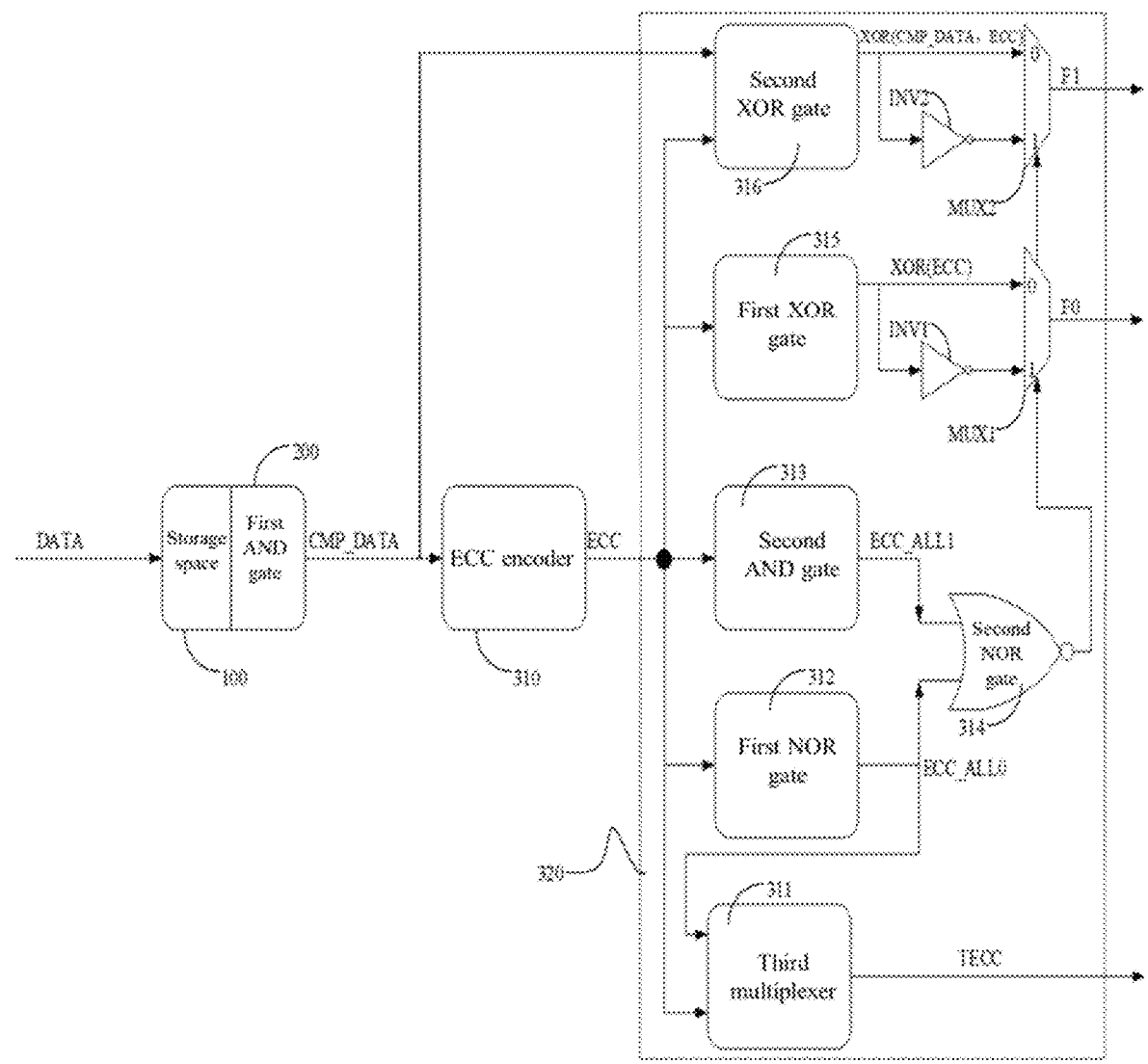
FIG. 10 is a schematic structural diagram of another memory chip according to some embodiments of the present disclosure.

In some embodiments, a memory chip is provided. As shown in FIG. 9 and FIG. 10, the memory chip includes one or more storage spaces, a first logic circuit 300 and a finite-state machine (FSM) 400. The first logic circuit 300 is configured to determine whether a quantity of one or more written memory units in a storage space of the one or more storage spaces 100 is less than or equal to a preset quantity or a write address corresponding to a write instruction is smaller than one of storage addresses of the storage space 100, and further configured to, in response to determining that the quantity of the one or more written memory units in the storage space 100 is less than or equal to the preset quantity or the write address corresponding to the write instruction is smaller than the one of storage addresses of the storage space 100, determine an operating state of the storage space 100 as a part programmed state. The FSM 400 is configured to disable an error correction mechanism for the storage space 100 in the part programmed state.

It may be understood that, according to the memory chip provided in herein, the operating state of the storage space 100 may be determined as the part programmed state when the quantity of the written memory units in the storage space 100 is less than or equal to the preset quantity or the write address corresponding to the write instruction is smaller than one of storage addresses of the storage space 100; and the error correction mechanism is disabled for the storage space 100 in the part programmed state. Since a quantity of written memory units in the storage space in the part programmed state is small, a reading success rate is still high without the error correction mechanism, and adverse effects brought by the error correction mechanism are reduced. For example, addition of threads that implement the error correction mechanism is required during a reading process, which reduces reading efficiency.

Since the operating state of the storage space 100 may be determined as the part programmed state through one of: determining that the quantity of the written memory units in the storage space 100 is less than or equal to the preset quantity; or determining the write address corresponding to the write instruction is smaller than one of storage addresses of the storage space 100. In this way, methods of determining the part programmed state are added, thereby improving applicability.

It is to be noted that the first logic circuit 300 is further configured to determine, in response to determining that the quantity of the written memory units in the storage space is greater than the preset quantity or the write address corresponding to the write instruction comprises a last storage address of the storage space, the operating state of the storage space 100 as an error correction protection state. The FSM 400 is further configured to enable the error correction mechanism for the storage space in the part programmed state.

The storage space 100 in FIG. 10 includes a memory array and a page buffer.

It is to be noted that the operating state of the storage space 100 may be determined as the error correction protection state when the quantity of the memory units in the storage space 100 that are written to is greater than the preset quantity or the write address corresponding to the write instruction includes the last address of the storage space 100, which helps to increase a quantity of storage spaces 100 in the error correction protection state. For example, if the error correction protection state is entered when only a small amount of data is written, the storage space 100 may enter a multiple write state (multiple programmed state) when the data is written again, in which case error correction protection cannot be performed on the storage space 100. On this basis, the error correction mechanism is enabled for the storage space 100 in the error correction protection state during the reading process, which can improve reading accuracy of a larger quantity of storage spaces 100 in the error correction protection state.

It is to be noted that the above memory chip may be, but is not limited to, a NOR Flash, and may alternatively be other applicable memories. The error correction mechanism may be a technology that can implement "error checking and correction", which can calculate a corresponding ECC.

In some embodiments, as shown in FIG. 9 and FIG. 10, the first logic circuit 300 includes a first AND gate 200, an error correction code (ECC) encoder 310 (e.g., a Hamming encoder), and a second logic circuit 320. The first AND gate 200 is used to determine a result of a AND logic operation on the page buffer data and the storage data as intermediate comparison data (CMP_DATA). The ECC encoder 310 is used to calculate an initial ECC based on the intermediate comparison data. The second logic circuit 320 is configured to calculate a second buffer flag calculated value based on the intermediate comparison data and the initial error correction code, and calculate a first buffer flag calculated value and a buffer error correction calculated value based on the initial error correction code.

It should be noted that TECC, F0, and F1 shown in FIG. 10 respectively represent the buffer error correction calculated value, the first buffer flag calculated value, and the second buffer flag calculated value. DATA represents a user's input data.

The second logic circuit 320 includes a first NOT-OR (NOR) gate 312, a second AND gate 313, a second NOT-OR (NOR) logic unit 314, a first exclusive-OR (XOR) gate 315, a first inverter INV1 (e.g., an OR gate), a second XOR gate 316, a second inverter INV2 (e.g., an OR gate), a first multiplexer MUX1, a second multiplexer MUX2, and a third multiplexer 311.

The first NOT-OR (NOR) gate 312 is configured to output a first logical detection result as to whether one or more bit values of the initial error correction code are all logical values "0".

It should be noted that the first NOR gate 312 is configured to output a logic value "1" when the initial error correction codes are all logic values "0", i.e., ECC_ALL0. When the initial error correction codes are not all logical values "0", the first NOT-OR (NOR) gate 312 outputs the logical value "0".

The second AND gate 313 is configured to output a second logical detection result whether the one or more bit values of the initial error correction code are all logical values "1".

It should be noted that the second AND gate 313 is used to output the output logical value "1" when the initial error correction codes are all logical values "1", i.e., ECC_ALL1. When the initial error correction codes are not all logical values "1", the second AND gate 313 outputs the logical value "0".

The second NOR gate 314 is configured to determine a NOR logic operation result between the first logical detection result and the second logical detection result as intermediate control data.

The first XOR gate 315 is used to perform a parity check (i.e., XOR(ECC)) on the initial error correction code to obtain a parity check result.

The first inverter INV1 is used to invert the parity check result to obtain a non-parity check result.

The second XOR gate 316 is used to perform an exclusive-OR (XOR) operation, that is, XOR (CMP_DATA, ECC), on the intermediate comparison data and the initial error correction code to obtain an XOR operation result.

The second inverter INV2 is used to invert the XOR operation result to obtain a non-XOR operation result.

The first multiplexer (MUX) MUX1 is used to, in response to determining that the intermediate control data is "1", select the non-parity check result as the second buffer flag calculated value. The first multiplexer MUX1 is used to, in response to determining that the intermediate control data is "0", select the parity check result as the second buffer flag calculated value.

The second multiplexer MUX2 is used to, in response to determining that the intermediate control data is "1", select the non-XOR operation result as the first buffer flag calculated value. The second multiplexer MUX2 is used to, in response to determining that the intermediate control data is "0", select the XOR operation result as the first buffer flag calculated value.

The third multiplexer 311 is configured to: in response to determining that the one or more bit values of the initial error correction code are all logical values "0", convert a code different from the initial error correction code as the buffer error correction calculated value; or in response to determining that the one or more bit values of the initial error correction code are not all logical values "1", directly outputting the initial error correction code as the buffer error correction calculated value.

In some embodiments, the logic gates (e.g., the AND gate, the OR gate, the XOR gate, the NOR gate) as described herein may include resistors, capacitors, diodes, triodes, or the like, or a combination thereof. For example, the logic gates include a Complementary Metal-Oxide-Semiconductor (CMOS), an N-channel metal-oxide semiconductor (NMOS), a P-channel metal-oxide semiconductor (PMOS), or the like, or any combination thereof. In some embodiments, the logic gates may also include a logic chip. Additionally or alternatively, the logic gates may be implemented by hardware or software, which is not limited in the present disclosure.

To sum up, after the user data is written into the storage array, TECC, F0, and F1 in the storage array are all logic values "0", which are used to define or represent the multiple programmed state, that is, performing multiple programming operations on one memory unit (NOR FLASH CELL) before erasing the one memory unit. After the user data is written into the storage array, TECC, F0, and F1 in the storage array are neither all "1" nor all "0", and are used to define or represent the error correction protection state, that is, performing merely one programming operation on one memory unit (NOR FLASH CELL) before erasing the one memory unit.

F0 may be used to represent that ECC can correct 1 bit errors and detect 2 bits errors. F1 may be used to distinguish the multiple programmed state from others.

It may be understood that the present disclosure can determine a memory unit capable of the multiple programmed state based on the user's input data, which can improve a selection width of the user or applicability compared with only performing one programming operation for each erase.

In some embodiments, the storage space includes a storage array. Data in the first flag bits, the second flag bits, and the error correction bits in the storage array are set as all "1" to represent the part programmed state of the storage space 100. The data in the first flag bits, the second flag bits, and the error correction bits in the storage array are set as all "0" to represent the multiple programmed state of the storage space 100. The data in the first flag bits, the second flag bits, and the error correction bits in the storage array are set as neither all "1" nor all "0" to represent the error correction protection state of the storage space 100.

The "multiple" mentioned herein two or more times.

In the above embodiments, each embodiment is described with its own emphasis. For parts that are not described in detail in a certain embodiment, please refer to the relevant descriptions of other embodiments.

Some embodiments of the present disclosure have been described in detail above. The description of the above embodiments merely aims to help to understand the present disclosure. Many modifications or equivalent substitutions with respect to the embodiments may occur to those of ordinary skill in the art based on the present disclosure. Thus, these modifications or equivalent substitutions shall fall within the scope of the present disclosure.

What is claimed is:

1. An operating method for a memory chip, wherein the memory chip comprises one or more storage spaces, and the operating method comprises:
   determining whether a quantity of one or more written memory units in a storage space of the one or more storage spaces is less than or equal to a preset quantity or a write address corresponding to a write instruction is smaller than one of storage addresses of the storage space;
   in response to determining that the quantity of the one or more written memory units in the storage space is less than or equal to the preset quantity or the write address corresponding to the write instruction is smaller than the one of storage addresses of the storage space, determining an operating state of the storage space as a part programmed state; and
   disabling an error correction mechanism for the storage space in the part programmed state.

2. The operating method of claim 1, wherein the determining of whether the quantity of the one or more written memory units in the storage space of the one or more storage spaces is less than or equal to the preset quantity comprises:
   when memory units in the storage space are in an erased state or an unwritten state, determining whether the quantity of the one or more written memory units in the storage space is less than or equal to the preset quantity based on a cumulative quantity of the written memory units in the storage space; or
   when the storage space has comprised write data before a data write into the storage space, determining whether the quantity of the one or more written memory units in the storage space is less than or equal to the preset quantity based on a total amount of the written data that has been comprised by the storage space and data that is written into the storage space in the data write.

3. The operating method of claim 1, wherein the preset quantity is a value less than or equal to ½ or ⅓ of a total quantity of memory units in the storage space.

4. The operating method of claim 1, further comprising:
   in response to determining that the quantity of the written memory units in the storage space is greater than the preset quantity or the write address corresponding to the write instruction comprises a last storage address of the storage space, determining an operating state of the storage space as an error correction protection state; and
   enabling the error correction mechanism for the storage space in the error correction protection state.

5. The operating method of claim 4, further comprising:
   performing one of: enabling an error correction mechanism during a read process for the storage space in response to determining that the operating state of the storage space is an error correction protection state; and disabling the error correction mechanism during the read process for the storage space in response to determining that the operating state of the storage space is the part programmed state.

6. The operating method of claim 1, further comprising setting at least one flag bit to represent the operating state of the storage space.

7. The operating method of claim 6, wherein the setting of the at least one flag bit to represent the operating state of the storage space comprises:
   configuring the at least one flag bit to comprise one or more first flag bits, one or more second flag bits, and one or more error correction bits for storing an error correction code; and
   setting the first flag bits, the second flag bits, and the error correction bits to represent the operating state of the storage space.

8. The operating method of claim 7, wherein the storage space comprises a storage array, and
   the setting of the first flag bits, the second flag bits, and the error correction bits to represent the operating state of the storage space comprises one of:
   setting data in the first flag bits, data in the second flag bits, and data in the error correction bits in the storage array as all "1" to represent a part programmed state, an erased state, or a storage initial state of the storage space;
   setting the data in the first flag bits, the data in the second flag bits, and the data in the error correction bits in the storage array as all "0" to represent the multiple programmed state of the storage space; and
   setting the data in the first flag bits, the data in the second flag bits, and the data in the error correction bits in the storage array as neither all "1" nor all "0" to represent the error correction protection state of the storage space.

9. The operating method of claim 8, wherein the storage space further comprises a page buffer,
   the first flag bits comprise a first buffer flag bit located in the page buffer and a first storage flag bit located in each of the memory units,
   the second flag bits comprise a second buffer flag bit located in the page buffer and a second storage flag bit located in the each of the memory units,
   the error correction bits comprise one or more buffer error correction bits located in the page buffer and one or more storage error correction bits located in the each of the memory units, and
   the setting of the first flag bits, the second flag bits, and the error correction bits to represent the operating state of the storage space comprises:
   setting the first storage flag bit to be a first storage flag initial value or a first storage flag final value, wherein the first storage flag initial value is a value of the first storage flag bit before input data corresponding to the write instruction is written into the each of the memory units, and the first storage flag final value is a value of the first storage flag bit after the input data corresponding to the write instruction is written into the each of the memory units;
   setting the second storage flag bit to be a second storage flag initial value or a second storage flag final value, wherein the second storage flag initial value is a value of the second storage flag bit before the input data corresponding to the write instruction is written into the each of the memory units, and the second storage flag final value is a value of the second storage flag bit after the input data corresponding to the write instruction is written into the each of the memory units;

setting the storage error correction bits to be a storage error correction initial value or a storage error correction final value, wherein the storage error correction initial value is a value of the storage error correction bits before the input data corresponding to the write instruction is written into the each of the memory units, and the storage error correction final value is a value of the storage error correction bits after the input data corresponding to the write instruction is written into the each of the memory units; and representing the operating state of the storage space by the first storage flag final value, the second storage flag final value, and the storage error correction final value.

10. The operating method of claim 9, further comprising:
setting the first buffer flag bit to comprise a first buffer flag initial value or a first buffer flag updated value, setting the second buffer flag bit to comprise a second buffer flag initial value or a second buffer flag updated value, and setting the buffer error correction bits to comprise a buffer error correction initial value or a buffer error correction updated value; and assigning the first buffer flag updated value, the second buffer flag updated value, and the buffer error correction updated value respectively as the first storage flag final value, the second storage flag final value, and the storage error correction final value.

11. The operating method of claim 9, wherein the determining of the operating state of the storage space comprises:
in response to determining that each of the first storage flag final value, the second storage flag final value, and the storage error correction final value is all "0", determining that the operation state of the storage space is the multiple programmed state;

in response to determining that the first storage flag final value, the second storage flag final value, and the storage error correction final value are respectively the first buffer flag calculated value, the second buffer flag calculated value, and the buffer error correction calculated value, determining that the operation state of the storage space is the error correction protection state; or in response to determining that each of the first storage flag final value, the second storage flag final value, and the storage error correction final value is all "1", determining that the operation state of the storage space is the part programmed state.

12. The operating method of claim 10, further comprising:
setting the first buffer flag updated value as one of 0, 1, and a first buffer flag calculated value;
setting the second buffer flag updated value as one of 0, 1, and a second buffer flag calculated value;
setting the buffer error correction updated value as one of all "0", all "1", and a buffer error correction calculated value; and
determining the first buffer flag updated value, the second buffer flag updated value, and the buffer error correction updated value based on the first storage flag initial value, the second storage flag initial value, and the storage error correction initial value.

13. The operating method of claim 12, further comprising:
determining the first buffer flag calculated value, the second buffer flag calculated value, and the buffer error correction calculated value based on page buffer data and storage data,
wherein the page buffer data is data of data bits in the page buffer after the input data is written into the page buffer, and the storage data is data of data bits in the each of the memory units before the input data is written into the each of the memory units.

14. The operating method of claim 13, wherein the determining of the first buffer flag calculated value, the second buffer flag calculated value, and the buffer error correction calculated value based on the page buffer data and the storage data comprises:
determining a result of an AND logical operation on the page buffer data and the storage data as intermediate comparison data;
calculating an initial error correction code based on the intermediate comparison data; and
calculating the second buffer flag calculated value based on the intermediate comparison data and the initial error correction code, and calculating the first buffer flag calculated value and the buffer error correction calculated value based on the initial error correction code,
wherein a result of a NAND operation on a first logical detection result indicating whether each bit value of the initial error correction code is a logical value "0" and a second logical detection result indicating whether each bit value of the initial error correction code is a logical value "1" is determined as intermediate control data;
wherein a parity check is performed on the initial error correction code to obtain a parity check result, and the parity check result is inverted to obtain a non-parity check result;
wherein an exclusive-OR (XOR) operation is performed on the intermediate comparison data and the initial error correction code to obtain an XOR operation result, and the XOR operation result is inverted to obtain a non-XOR operation result;
wherein in response to determining that the intermediate control data is "1", the non-XOR operation result and the non-parity check result are selected as the first buffer flag calculated value and the second buffer flag calculated value, respectively,
or in response to determining that the intermediate control data is "0", the XOR operation result and the parity check result are selected as the first buffer flag calculated value and the second buffer flag calculated value, respectively; and
wherein in response to determining that each bit value of the initial error correction code is a logical value "0", the initial error correction code is converted into a different code as the buffer error correction calculated value,
or in response to determining that at least one bit value of the initial error correction code is not the logical value "0", outputting the initial error correction code as the buffer error correction calculated value.

15. A memory chip, comprising:
one or more storage spaces;
a first logic circuit configured to determine whether a quantity of one or more written memory units in a storage space of the one or more storage spaces is less than or equal to a preset quantity or a write address corresponding to a write instruction is smaller than one of storage addresses of the storage space, and further configured to, in response to determining that the quantity of the one or more written memory units in the storage space is less than or equal to the preset quantity or the write address corresponding to the write instruction is smaller than the one of storage addresses of the storage space, determine an operating state of the storage space as a part programmed state; and a finite-state machine configured to disable an error correction mechanism for the storage space in the part programmed state.

16. The memory chip of claim 15, wherein
the first logic circuit is further configured to determine, in response to determining that the quantity of the written memory units in the storage space is greater than the preset quantity or the write address corresponding to the write instruction comprises a last storage address of the storage space, the operating state of the storage space as an error correction protection state; and
the finite-state machine is further configured to enable the error correction mechanism for the storage space in the error correction protection state.

17. The memory chip of claim 16, wherein the memory chip comprises one or more first flag bits, one or more second flag bits, and one or more error correction bits for storing an error correction code which are used to represent the operating state of the storage space, and the operating state comprises a multiple programmed state that disables the error correction mechanism for the storage space.

18. The memory chip of claim 17, wherein the storage space comprises a storage array,
wherein data in the first flag bits, data in the second flag bits, and data in the error correction bits in the storage array that are all "1" are used to represent a part programmed state, an erased state, or a storage initial state of the storage space;
the data in the first flag bits, the data in the second flag bits, and the data in the error correction bits in the storage array that are all "0" are used to represent the multiple programmed state of the storage space; or
the data in the first flag bits, the data in the second flag bits, and the data in the error correction bits in the storage array that are neither all "1" nor all "0" are used to represent the error correction protection state of the storage space.

19. The memory chip of claim 18, wherein the storage space comprises one or more first flag bits, one or more second flag bits, and one or more error correction bits for storing an error correction code, and the storage space comprises a page buffer and a plurality of memory units;
wherein the first flag bits comprise a first buffer flag bit located in the page buffer and a first storage flag bit located in each of the memory units,
the second flag bits comprise a second buffer flag bit located in the page buffer and a second storage flag bit located in the each of the memory unit, and
the error correction bits comprise one or more buffer error correction bits located in the page buffer and one or more storage error correction bits located in the each of the memory unit;
wherein the first storage flag bit has a first storage flag initial value or a first storage flag final value, the first storage flag initial value is a value of the first storage flag bit before input data corresponding to the write instruction is written into the each of the memory unit, and the first storage flag final value is a value of the first storage flag bit after the input data corresponding to the write instruction is written into the each of the memory unit,
the second storage flag bit has a second storage flag initial value or a second storage flag final value, the second storage flag initial value is a value of the second storage flag bit before the input data corresponding to the write instruction is written into the each of the memory unit, and the second storage flag final value is a value of the second storage flag bit after the input data corresponding to the write instruction is written into the each of the memory unit,
the storage error correction bits has a storage error correction initial value or a storage error correction final value, the storage error correction initial value is a value of the storage error correction bits before the input data corresponding to the write instruction is written into the each of the memory unit, and the storage error correction final value is a value of the storage error correction bits after the input data corresponding to the write instruction is written into the each of the memory unit; and
the first logic circuit is further configured to represent the operating state of the storage space by the first storage flag final value, the second storage flag final value, and the storage error correction final value.

20. The memory chip of claim 19, wherein the first buffer flag bit has a first buffer flag initial value or a first buffer flag updated value, the second buffer flag bit has a second buffer flag initial value or a second buffer flag updated value, and the buffer error correction bits has a buffer error correction initial value or one or more buffer error correction updated values, and
the first logic circuit is further configured to assign the first buffer flag updated value, the second buffer flag updated value, and the buffer error correction updated values respectively as the first storage flag final value, the second storage flag final value, and the storage error correction final value;
wherein the first buffer flag updated value is one of 0, 1, and a first buffer flag calculated value,
the second buffer flag updated value is one of 0, 1, and a second buffer flag calculated value,
the buffer error correction updated values are all "0", all "1", and all a buffer error correction calculated value, and
the first logic circuit is further configured to determine the first buffer flag updated value, the second buffer flag updated value, and the buffer error correction updated values based on the first stored flag initial value, the second stored flag initial value, and the storage error correction initial value;
wherein the storage space stores page buffer data and storage data,
the page buffer data is data of data bits in the page buffer after the input data is written into the page buffer,
the storage data is data of data bits in the each of the memory units before the input data is written into the each of the memory units; and
the first logic circuit is further configured to determine the first buffer flag calculated value, the second buffer flag calculated value, and the buffer error correction calculated value based on the page buffer data and the storage data;

wherein the first logic circuit further comprises:
a first AND gate configured to determine a result of an AND logical operation on the page buffer data and the storage data as intermediate comparison data;
an error correction code encoder configured to calculate an initial error correction code based on the intermediate comparison data; and
a second logic circuit configured to calculate the second buffer flag calculated value based on the intermediate comparison data and the initial error correction code, and calculate the first buffer flag calculated value and the buffer error correction calculated value based on the initial error correction code,
wherein the second logic circuit comprises:
a first NOT-OR (NOR) gate configured to output a first logical detection result indicating whether each bit value of the initial error correction code is a logical value "0",
a second AND gate configured to output a second logical detection result indicating whether each bit value of the initial error correction code is a logical value "1",
a second NOT-OR (NOR) gate configured to determine a result of a NOR operation on the first logical detection result and the second logical detection result as intermediate control data,
a first exclusive-OR (XOR) gate configured to perform a parity check on the initial error correction code to obtain a parity check result,
a first inverter configured to invert the parity check result to obtain a non-parity check result,
a second XOR gate configured to perform an exclusive OR (XOR) operation on the intermediate comparison data and the initial error correction code to obtain an XOR operation result,
a second inverter configured to invert the XOR operation result to obtain a non-XOR operation result,
a first multiplexer configured to, in response to determining that the intermediate control data is "1", select the non-parity check result as the second buffer flag calculated value, or in response to determining that the intermediate control data is "0", select the parity check result as the second buffer flag calculated value,
a second multiplexer configured to, in response to determining that the intermediate control data is "1", select the non-XOR operation result as the first buffer flag calculated value, or in response to determining that the intermediate control data is "0", select the XOR operation result as the first buffer flag calculated value,
a third multiplexer configured to, in response to determining that each bit value of the initial error correction code is a logical value "0", convert the initial error correction code into a different code as the buffer error correction calculated value.

* * * * *